Patented Mar. 6, 1951

2,544,093

UNITED STATES PATENT OFFICE 2,544,093

DEODORANT COMPOSITIONS

Lowell B. Kilgore, Washington, D. C., assignor to Kilgore Chemicals, Inc., Washington, D. C., a corporation of Delaware No Drawing. Application April 20, 1948, Serial No. 22,242

8 Claims. (Cl. 167—22)

This invention relates to new compositions of matter for use as deodorants and to methods of employing said compositions. More specifically, this invention concerns new compositions for treating air in a confined space, whereby such odors as may be present are destroyed.

The problem of space deodorization has been complicated by the paucity of knowledge concerning either the relationship between chemical constitution or the mechanicm whereby the odors affect the olfactory senses. Many theories have been advanced, but there has been substantially little agreement among the experts in the field. It has been very difficult therefore to develop chemical compositions which, when diffused in the air, will remove or destroy the odors present. This problem has been further complicated by the fact that the deodorizing chemicals must meet certain requirements which will permit their practical use. The composition must not only be non-toxic to humans and warm blooded animals, either by ingestion or prolonged inhalation, but it must cause no irritating effects. The composition must have a high flash point and should not form a combustible mixture with the air under the conditions of ordinary usage. It should be innocuous to the objects and surfaces present in the environment in which it is employed. For example, such compositions should not stain or injure paper, cloth, painted or lacquered surfaces or corrode metal. The compositions must also be stable, even in highly dispersed form so that the deodorant chemicals will be active for a sufficient length of time to enable them to act on substantially all the odorous substances present in the air. Furthermore, the compositions should not be odorous themselves to the extent that they will replace their own odors for those which they eliminate.

Although a great deal of research has been and is being conducted with the view of finding chemical deodorant compositions having the afore-described characteristics, it has thus far met with little or no success. The chemical deodorants currently in use rely, generally, upon masking effects. In other words, they do not eliminate the odors already present, but overwhelm or offset them with a stronger and more pleasant one. Actually, masking chemicals are not true deodorants at all, inasmuch as they do not destroy odors, but add another. Since the perception of and reaction to odors are largely subjective, a masking odor which may be pleasant to some people may be objectionable to others. Furthermore, some individuals may be more sensitive to the objectionable odors present than to the masking odor. Formaldehyde when dispersed in the air apparently has the ability to destroy atmospheric odors and has, to some extent, been employed for this purpose. However, it possesses irritant and depressant characteristics which make its use inadvisable.

The object of this invention is to provide chemical compositions which, when dispersed into the air, will destroy atmospheric odors. Another object is to provide deodorant compositions of matter which will be stable even in highly dispersed form.

Still another object is to provide deodorant compositions which will destroy atmospheric odors without, at the same time, substituting any appreciable residual odors.

Further objects are to provide deodorant compositions which are nontoxic and non-irritating to humans and warm blooded animals and which will not injure or stain objects present in the environment in which they are employed, such as fabrics, metals, wood and the like.

Still another object is to provide methods for effectively utilizing the deodorant properties of said compositions.

Still other objects and advantages of the invention will become obvious from the following description.

I have discovered that compounds having the general formula:

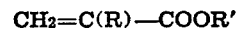

$$CH_2=C(R)-COOR'$$

wherein R is hydrogen or an alkyl radical of low molecular weight and R' is an alkyl radical containing at least 8 carbon atoms, possess marked deodorant properties when dispersed into an odorous confined space under suitable conditions. In general, these compounds are colorless, non-volatile liquids and are relatively unstable due to a tendency to polymerize. When the esters are to be stored for any length of time, it is advisable to stabilize them with an inhibiting catalyst, such as hydroquinone.

When dispersed into the air, even when stabilized with an inhibiting catalyst such as hydroquinone, these esters exert no appreciable protracted deodorant effect. However, I have discovered that solutions of these compounds in organic, inert, non-polar solvents, such as hydrocarbon oils, when dispersed in the air, even in the finely diffused form of an aerosol, possess protracted and efficient deodorant properties. I have found such diluents exert a highly stabilizing effect and maintain the dispersed esters in an active state for sufficient lengths of time to permit them effectively to destroy the odorous substances present in the atmosphere. The esters apparently react chemically with the odorous substances in the air to form substantially non-odorous compounds. At the same time, the deodorant compounds, particularly when diluted with inert, non-polar solvents, such as hydrocarbon oils, impart substantially little or no odor to the air. Furthermore, the deodorant compositions of my invention may be inhaled for prolonged periods or ingested by humans and warm blooded animals without any toxic or irritating effects. They do not stain or injure fabrics, paper, metal or painted or lacquered surfaces. They have high flash points and do not form combustible mixtures with the air under the conditions of ordinary usage.

I have formulated into my new deodorant compositions and tested numerous examples of these esters including:

| | |
|---|---|
| octyl methacrylate | lauryl acrylate |
| decyl methacrylate | myristyl acrylate |
| undecyl methacrylate | heptadecyl methacrylate |
| lauryl methacrylate | octadecyl methacrylate |

Lauryl methacrylate is particularly effective for my purpose, since it is substantially odorless, non-irritating or otherwise unpleasant when dispersed in the air, in the concentrations required for effective use.

Although any organic, non-polar solvent which is inert, namely, non-reactive with the chemically active esters, may be employed, I prefer to use hydrocarbon oils such as light mineral oils of medium boiling range, or deodorized kerosene. Such hydrocarbon oils are highly stabilizing, readily dispersible even in aerosol form, substantially non-odorous and were found to form mixtures with the high molecular weight deodorant esters, which have the requisite fugacity to render them effective deodorants.

The deodorant compositions of my invention may be dispersed into the air in any desired manner, such as by spraying. However, I have found that their deodorant properties are most effectively utilized when they are dispersed in exceedingly minute droplets, such as are present, in the colloidal dispersion known as an aerosol.

I have found that the size of the droplet is a critical factor with respect to the efficiency of my deodorant compositions. In other words, the area of the air-mixture interface should be greater than that usually obtained by conventional hand operated sprayers in order to obtain really effective deodorization.

I have also discovered that the compositions of my invention dissolve readily in certain low boiling solvents which are normally gaseous under conditions of normal temperature and pressure, and which are readily maintained in a non-gaseous state under pressure, as in a pressure cylinder. These solvents under pressure act as propellant vehicles for the dissolved deodorant compositions when an exit orifice is provided and the pressure is reduced sufficiently at ordinary temperatures to permit the necessary volatilization. The relatively non-volatile components, namely the deodorant ester compounds and hydrocarbon oil, are thus propelled into the air in the form of a highly dispersed colloidal aerosol. The mechanics of such aerosol formation are disclosed in United States Patent No. 2,321,023 to Lyle D. Goodhue.

Any suitable propellant solvent may be employed so long as the solvent is miscible and not reactive with the esters of my compositions under conditions of normal usage. It is advisable also for ordinary usage to employ propellants which are non-toxic and not readily inflammable. Examples of such suitable propellant vehicles are the low boiling, halogenated hydrocarbons such as the halogenated methanes, ethanes, and butanes which are gaseous under normal conditions of temperature and pressure. The low boiling hydrocarbons such as propane and butane may be used, but have the disadvantage of being readily flammable. Particularly suited to my purpose are the halogenated methanes such as dichloro-difluoromethane, chlorodifluoromethane, and the like. These solvents are readily miscible with my ester-hydrocarbon oil compositions and exert pressures which are particularly suitable for advantageous dispersion of my deodorant compositions. Preferably, the total vapor pressure should be under 10 atmospheres at room temperature, although this is not essential.

When a solution comprising one of the aforedescribed esters, a hydrocarbon oil and a suitable solvent under pressure, such as dichlorodifluoromethane is released into the air by means of a suitable nozzle, an aerosol is formed consisting of minute droplets of the ester solution in the oil. An enormous surface area of the solution is thus presented at the air-solution interface to facilitate rapid reaction between the ester and the odorous substances in the air. The aerosol formed in this manner eliminates the odors present, leaving the air in a substantially odorless state.

I have found that the hydrocarbon component greatly extends the duration of the deodorant properties of the aerosol. Although the proportion of hydrocarbon oil employed is subject to considerable variation, a particularly advantageous composition range is one which is approximately equal to one to three times the amount of the ester used.

The esters comprising my invention are readily miscible of themselves, with the propellant vehicles described above, even in the absence of an inert, non-polar solvent such as hydrocarbon oils. However, the aerosol formed with such a composition has been found to be relatively ineffective. The minute aerosol droplets which are suspended in the air after evaporation of the highly volatile propellant solvent consist solely of the unstable ester compound. Under these conditions a rapid self-polymerization process apparently takes place, which quickly ineffectuates the ester with respect to reaction with the odorous substances in the air.

In order to test the deodorization efficiency of my compositions I have conducted both laboratory tests employing an empirical set of standardized and reproducible conditions and practical tests under conditions of intended usage. For purposes of the laboratory tests a small mixing chamber was made using a 500 cc. three-necked Wolff bottle having a large circular hole in the bottom. In order to simulate as closely as possible those odors which are commonly encountered in homes, restaurants and public buildings, a number of such odors were prepared in concentrated form. The odoriferous substances which steam distill into the air during the conventional cooking of cabbage, garlic and onions, were prepared in concentrated form by steam distilling these vegetables and storing the condensates from the respective materials in large glass containers.

Air saturated with stale tobacco smoke was simulated in concentrated form by storing glass carboys filled with cigar smoke for several days. To make the tests, the concentrated odors were forced from the carboy into the inverted Wolff bottle through a glass tube connecting the carboy to one of the necks of the Wolff bottle by means of a rubber pressure bulb attached to the carboy. The aperture in the bottom of the inverted Wolff bottle was covered by means of a watch glass of suitable size. The Wolff bottle now contained a concentrated odor. The deodorant composition to be tested was atomized into another carboy. Approximately 500 cc. of treated air from this carboy was then forced through a glass tube into the Wolff bottle containing the concentrated odor by means of a pressure bulb. After a two minute mixing and reaction period, the watch glass was removed from the Wolff bottle and the treated air was blown out of the large opening by means of a pressure bulb attached to the center neck of the bottle. This blown out air was inhaled by different individuals and it could thus be determined whether or not the odor had been destroyed.

*Example I.*—A five gallon carboy was filled with an aerosol produced from a cylinder containing 5% by weight of lauryl methacrylate, 10% light white mineral oil, and 85% dichlorodifluoromethane under a pressure of 87 pounds per square inch. Air containing a concentrated odor of stale cigar smoke was introduced into the Wolff bottle mixer from a carboy as described above, and an approximately equal amount of air containing the aerosol was then introduced into the mixer from the second carboy. When the treated air was blown out of the mixer after a two minute reaction period, it was found to be substantially odorless, indicating that the tobacco odor had been destroyed. As a control, the same procedure was repeated excepting that an equal volume of untreated air was used in place of the aerosol-treated air. All observers could plainly detect the strong odor of stale cigar smoke.

*Example II.*—A five gallon carboy was filled with an aerosol produced from a cylinder containing 16% by weight of lauryl methacrylate and 84% dichlorodifluoromethane under a pressure of 87 pounds per square inch. The air containing this aerosol was then introduced into a Wolff bottle mixer containing stale cigar smoke. After reaction period of two minutes the treated air was blown out of the mixer and it was found to retain the undesirable tobacco odor. Apparently this aerosol suspensoid of lauryl methacrylate had lost its efficacy as a deodorant during the short period in the carboy.

Practical tests under actual conditions of intended usage of the aerosol deodorants were made in a closed, carpeted room having a volume of about 1200 cubic feet. Odors were generated in the closed room as by boiling odorous vegetables or by burning cigars and cigarettes. The deodorant aerosol was then introduced into the contaminated air. After allowing a short time, usually five minutes, for the deodorization reaction to take place, a number of observers entered the room and made observations as to the residual odor present.

The following representative tabulation of results obtained in this manner is illustrative. The test aerosol was produced from a pressure cylinder containing 5% lauryl methacrylate, 10% light white mineral oil and 85% dichlorodifluoromethane.

TABLE

*Observation by different individuals*

| Odor Used | Correctly Identified | No Odor | Different Odor |
|---|---|---|---|
| | Per cent | Per cent | Per cent |
| Cabbage | 20 | 60 | 20 |
| Tobacco | 0 | 100 | 0 |
| Onions | 14 | 43 | 43 |

*Example III.*—10 grams of a solution consisting of 6 grams of lauryl methacrylate and 4 grams of U. S. P. light white mineral oil were dissolved in 90 grams of dichlorodifluoromethane under a pressure of 87 pounds per square inch contained in a 500 cc. steel pressure cylinder equipped with a valve and discharge nozzle capable of producing an aerosol mist. The aerosol produced with this composition exectively destroyed odors when discharged into a confined space.

*Example IV.*—2 grams of myristyl acrylate were dissolved in 8 grams of light white mineral oil and the solution added to 85 grams of dichlorodifluoromethane in a pressure cylinder as in Example III. The aerosol formed with this composition was effective in destroying odoriferous substances in the air.

*Example V.*—1.94 grams of octodecyl methacrylate were dissolved in 7.26 grams of deodorized kerosene and the solution added to 82.8 grams of dichlorodifluoromethane in a pressure cylinder, as in Example III. The aerosol formed with this composition effectively destroyed odors present in the air.

*Example VI.*—4.5 grams of lauryl methacrylate was dissolved in 215.5 grams of dichlorodifluoromethane in a pressure cylinder, as in Example III. This composition when dispersed in an aerosol was found to be ineffective as a deodorant.

The concentration of ester employed may vary considerably. For example, I have found that concentrations ranging from about 0.5% to about 20% by weight are effective for general purposes. The preferred range of concentration is about 3 to 8%. Similarly, the amount of dispersing agent employed may vary. However, it must be present in sufficient concentration to permit efficient volatilization and atomization. Generally speaking, the dispersing agent should be present in a concentration comprising at least 80% by weight of the total composition.

I have disclosed a number of examples and embodiments which are illustrative of my invention. However, it will be obvious to those skilled in the art that my invention encompasses a considerable number of variations within the scope of my claims.

Having thus fully described my invention, I claim:

1. A deodorant composition comprising a solution of an ester having the general formula:

$$CH_2=C(R)-COOR'$$

wherein R is a radical selected from the group consisting of hydrogen and an alkyl radical of low molecular weight and R' is alkyl containing at least 8 carbon atoms, dissolved in an inert, non-polar organic solvent, said solution being incorporated into a miscible, non-gaseous propellant agent which is maintained in said non-gaseous state at normal temperatures by the application of pressure.

2. A deodorant composition comprising a solution of an ester having the general formula:

$$CH_2=C(R)-COOR'$$

wherein R is a radical selected from the group consisting of hydrogen and an alkyl radical of low molecular weight and R' is alkyl containing at least 8 carbon atoms, dissolved in a hydrocarbon oil, said solution being incorporated into a miscible, non-gaseous propellant agent which is maintained in said non-gaseous state at normal temperatures by the application of pressure.

3. A deodorant composition comprising a solution of an ester having the general formula:

$$CH_2=C(CH_3)-COOR'$$

wherein R' is alkyl containing at least 8 carbon atoms, dissolved in a hydrocarbon oil, said solution being incorporated into a miscible, non-gaseous propellant agent which is maintained in said non-gaseous state at normal temperatures by the application of pressure.

4. A deodorant composition comprising a solution of lauryl methacrylate dissolved in a hydrocarbon oil, said solution being incorporated into a liquid chloro-fluoromethane which is maintained in said liquid state at normal temperatures by the application of pressure.

5. A deodorant composition comprising a solution of lauryl methacrylate in light mineral oil, said solution being incorporated into liquid dichlorodifluoromethane.

6. A deodorant composition comprising a solution of lauryl methacrylate in deodorized kerosene, said solution being incorporated into liquid dichlorodifluoromethane.

7. A deodorant composition comprising a solution of an ester having the general formula:

$$CH_2=C(CH_3)-COOR'$$

wherein R' is alkyl containing at least 8 carbon atoms, dissolved in light mineral oil, said solution being incorporated into a miscible, non-gaseous propellant agent which is maintained in said non-gaseous state at normal temperatures by the application of pressure.

8. A deodorant composition comprising a solution of lauryl methacrylate dissolved in inert, non-polar solvent, said solution being incorporated into a miscible, non-gaseous propellant agent which is maintained in said non-gaseous state at normal temperatures by the application of pressure.

LOWELL B. KILGORE.

REFERENCES CITED

The following references are of record in the file of this patent:

UNITED STATES PATENTS

| Number | Name | Date |
|---|---|---|
| 2,070,167 | Iddings | Feb. 9, 1937 |
| 2,321,023 | Goodhue et al. | June 8, 1943 |

FOREIGN PATENTS

| Number | Country | Date |
|---|---|---|
| 801,658 | France | Aug. 12, 1936 |

OTHER REFERENCES

Kilgore, Soap and Sanitary Chemicals, Feb. 1946, pp. 122–124.